No. 769,117.

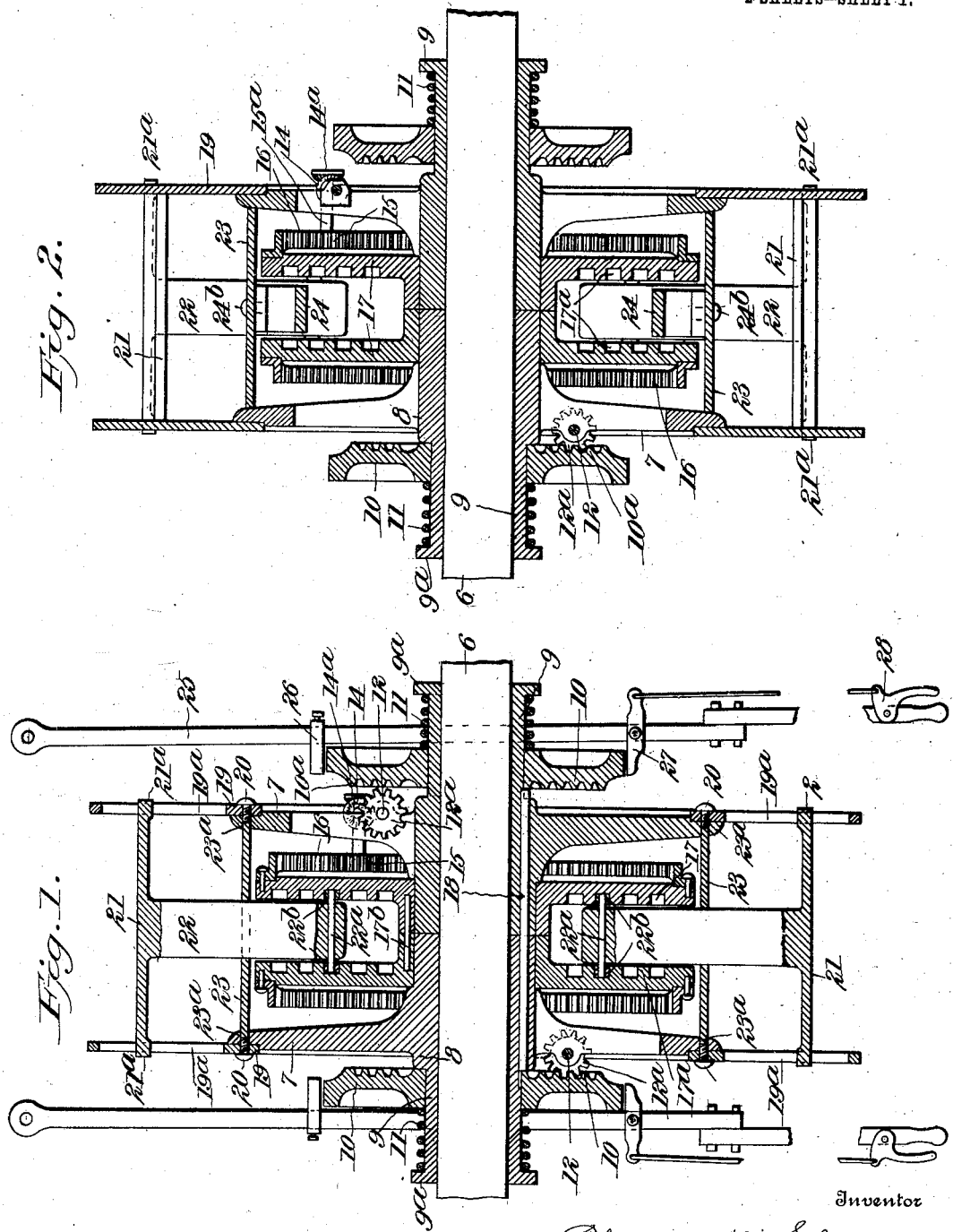

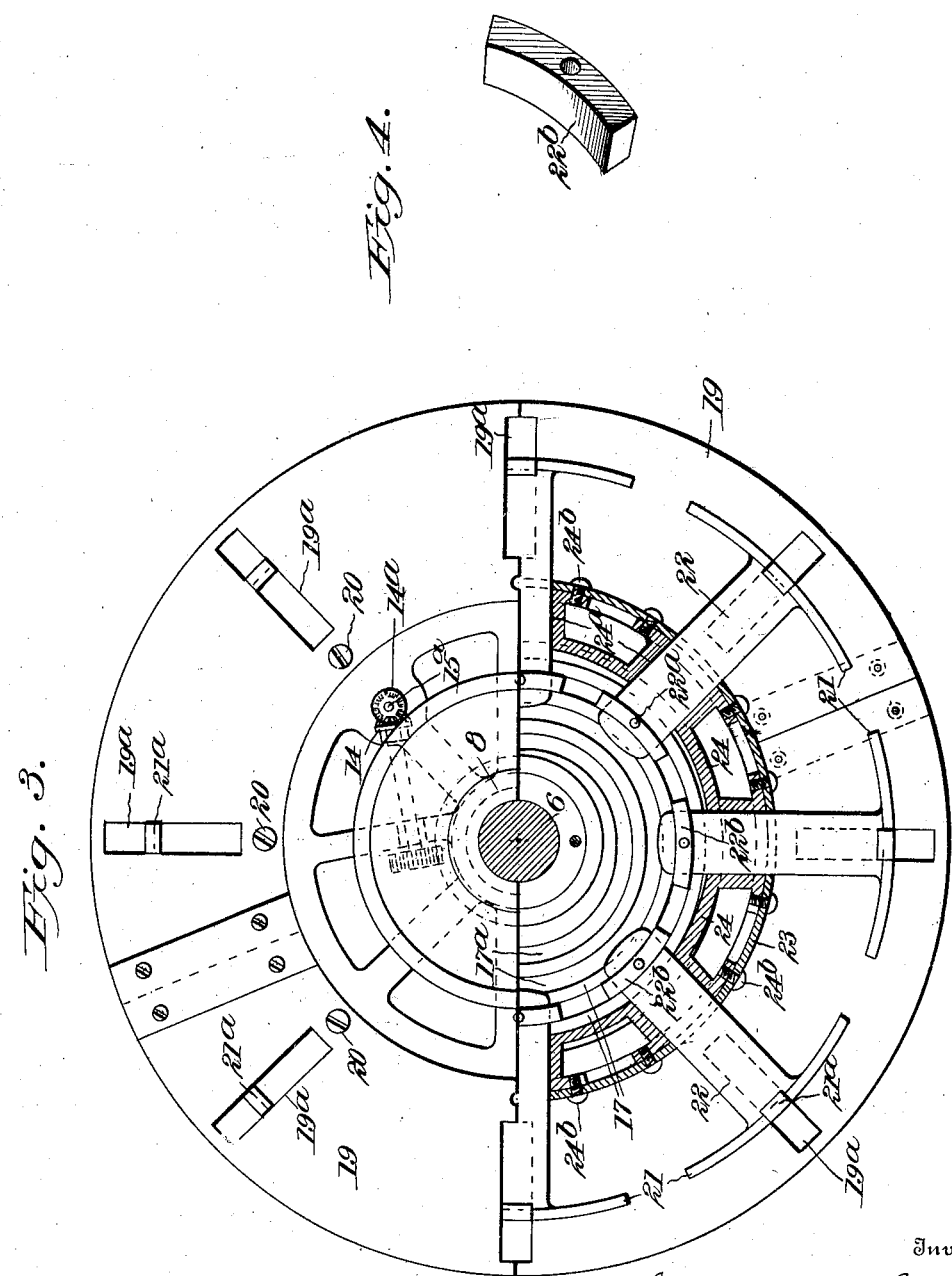

Patented August 30, 1904.

UNITED STATES PATENT OFFICE.

PHILIP H. SHUE, OF DENVER, COLORADO.

EXPANSIBLE PULLEY.

SPECIFICATION forming part of Letters Patent No. 769,117, dated August 30, 1904.

Application filed November 9, 1903. Serial No. 180,333. (No model.)

*To all whom it may concern:*

Be it known that I, PHILIP H. SHUE, a citizen of the United States, residing at Denver, in the county of Arapahoe and State of Colorado, have invented new and useful Improvements in Expansible Pulleys, of which the following is a specification.

This invention relates particularly to expansible pulleys in which the expansion of rim-segments is produced by the use of disks having a spiral groove, and more particularly to improvements in my Patent No. 718,800, issued January 20, 1903.

The object of the invention is to improve the construction of such pulleys, especially with respect to the adjusting-rings, which control the movement of the segments, and consequently the size of the pulley. The construction herein shown has a friction-clutch permitting gradual starting and stopping of the adjusting-rings instead of the positive action as shown in said patent. Improvement is also shown and claimed with respect to the construction of the pulley-frame, permitting a greater degree of contraction.

A further object is to produce positive guides for the stems of the segments, so that they will remain in absolute alinement to prevent binding.

Various other improvements in details of construction will be apparent from the following description and the accompanying drawings.

In the drawings, Figure 1 is a central section of the pulley lengthwise of the shaft. Fig. 2 is a similar section in a different plane. Fig. 3 is a half elevation and transverse section, and Fig. 4 is a detail in perspective showing one of the bearing-blocks which is carried by a pin on the inner end of the stems of the rim-segments and which fit in the grooves.

Referring specifically to the drawings, the main shaft is indicated at 6. The pulley-frame is formed of two split side sections 7, the hubs 8 of which meet at the middle of the pulley when the parts are assembled. Said hubs are extended outwardly, as at 9, to form a bearing for the adjusting-rings 10 thereon. These rings are split and the halves joined together in any suitable manner, and each has on the inner face thereof a spiral or worm gear $10^a$. Springs 11, in compression between the hub of the rings and the flange $9^a$, tend to keep the rings in gear with the pinion $12^a$, the shaft 12 of which finds its bearings on the frame 7 and carries at its outer end a bevel-gear 14, in mesh with a corresponding gear $14^a$, the shaft $15^a$ of which extends through bearings in the side plate of the pulley and carries a pinion 15, meshing with an internal gear 16, produced in the rim of the adjusting-disks 17. These disks are split, as indicated in my former patent, and have on the inner faces thereof spiral grooves $17^a$. The disks 17 are rotatable on the hub of the frame, and the hubs of the disks meet at the middle line of the pulley and are joined by well-fitting dowel-pins $17^b$. The hub of the main frame is cored lengthwise to receive a spacing-rod 18, which extends between the hubs of the adjusting-rings, and has for its purpose to space the adjusting-rings apart, so that they move simultaneously, and when one is in full gear with its pinion $12^a$ the other is out of gear, and the springs 11 are balanced, so that normally both adjusting-rings are in gear with the pinions and any action thereof is counteracted. To the rim of each of the side sections 7 an outer annular rim 19 is fastened by cap-screws 20, and this rim has guide-slots $19^a$ for the rim-segments 21, which have lugs $21^a$ fitting in said slots. These rims also serve to hold the belt on the pulley. The stems 22 of the rim-segments extend inwardly and radially between the disks 17, and each has at the inner end thereof a cross-pin $22^a$, extending through a bore in said stems and projecting into the opposite grooves of the disks. On each end of the pin and within the groove is a segmental bearing-block $22^b$, the surfaces of which are properly curved to conform closely to the sides of the groove. The purpose of this is to avoid any looseness or play of the segments. The blocks $22^b$ are loosely fitted on the pins, so that they conform without binding friction to the grooves. They also serve to give a more firm support to the segments to resist the radial thrust thereon.

For the purpose of positively guiding the stems and keeping them in exact radial alinement spacing-plates 23 are provided. These plates are fitted between the rims of the frames 7 and have lugs 23ª on the sides which fit into depressions communicating with the tapped holes for the cap-screws 20, so that when the screws are tightened their points bear against the lugs and assist in holding the plates in position. Each plate has a hole at the middle through which the stem 22 works at a close fit. This keeps the stem in alinement and prevents any distortion or binding incident to the tangential pull on the segments. To further assist in holding the plates 23 in position and to guide the stems, inner segmental guides 24 are employed. Each of these consists of a casting having end surfaces 24ª, between which are spaces disposed in radial alinement with respect to the wheel. The said surfaces are in guiding contact with the stems 22. These pieces are fastened to the plates 23 by screws, as at 24ᵇ, and are located between the adjusting-disks 17. It will be seen that in connection with said plates they make a complete ring around the pulley of sufficient body and strength to support the tangential strain and to form rigid guides for the radial movement of the stems. The levers to shift the adjusting-ring are shown at 25 suitably bowed over the shaft and pivoted at some fixed point in a manner common to this class of levers. Each carries clamps 26 and 27, the latter of which is controlled by a hand-latch 28 to throw the clamp into or out of engagement with the rim of the adjusting-rings 10.

In operation the springs 11 keep both adjusting-rings partially in contact with the shifting gear, and thereby the pulley must remain constant, as one side opposes the other, and the pulley cannot "crawl" or shift itself in the slightest. To change the diameter of the pulley, the lever 25 is pressed against the rim of the ring, which throws the gear of the ring in full engagement with the pinion 12ª, and by means of the spacing-rod 18 the adjusting-ring on the other side is thrown out of gear. The clamp is then applied to the rim of the adjusting-ring by means of the hand-latch, effecting a friction-clutch which gradually stops the movement thereof. The continued revolution of the pulley causes the rotation of the pinion 12ª by its engagement in the worm-gear 10ª and accordingly turns the adjusting-disks 17, which draws the pulley-segments in or out, according to the direction of rotation.

The above description indicates the preferable embodiment in a split pulley; but it is obvious that the same invention may be used in connection with a solid pulley, and the scope of the invention is not limited to the specific construction set forth, nor otherwise than is indicated in the following claims.

What I claim as new, and desire to secure by Letters Patent, is—

1. The combination with a pulley-frame having radially-guided movable rim-segments, of oppositely-operating expansion devices on each side of the frame, and a connection between said devices constructed to disengage one device when the other is in operative engagement.

2. The combination with the frame having radially-guided movable rim-segments, and spirally-grooved expansion-disks supporting said segments, of oppositely-acting adjusting devices on each side of the frame and geared to the disks, and a rod extending through the frame and between said devices, and constructed to throw one device out of gear when the other is in gear.

3. The combination with a pulley having adjusting-rings on opposite sides of the hub thereof, and the radially-guided and movable rim-segments actuated by the rings, of a spacing-rod extending between the rings and through the pulley.

4. The combination with a pulley having an expansible segmental rim, of adjusting-rings on opposite sides of the hub of the pulley and geared to the segments, springs bearing against the rings and tending to keep both in partial gear, and a rod extending through the hub between the rings, spacing the same apart, so that when one is thrown in full gear the other is thrown out of gear.

5. The combination with the frame, and the spirally-grooved expansion-disks therein, of the rim-segments having stems extending between the disks, the radial guides on the frame for the stems and the movable bearing-blocks carried by the stem, in the grooves.

6. The combination with the frame, and the spirally-grooved expansion-disks therein, of the radially-movable rim-segments having stems with projections engaging the grooves, and guides for the stems, supported on the frame.

7. The combination with the frame, and the spirally-grooved expansion-disks therein, of the radially-movable rim-segments having stems with projections engaging the grooves, and the segments fixed to the frame, between the stems and having radial guides therefor.

In testimony whereof I have signed my name to this specification in the presence of two subscribing witnesses.

PHILIP H. SHUE.

Witnesses:
MILTON SMITH,
THOMAS F. DILLON, Jr.